US009466053B2

United States Patent
Johnson et al.

(10) Patent No.: US 9,466,053 B2
(45) Date of Patent: *Oct. 11, 2016

(54) ATM CUSTOMER DEFINED USER INTERFACE FOR SECURITY PURPOSES

(71) Applicant: Bank of America Corporation, Charlotte, NC (US)

(72) Inventors: Tyler Johnson, Tega Cay, SC (US); Sara Gill, New York, NY (US); Christian Michael Mande, Charlotte, NC (US); James Robert Grimsley, Dover, FL (US); Kristy M. Crist, Charlotte, NC (US); Nathan Dent, Concord, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/049,615

(22) Filed: Feb. 22, 2016

(65) Prior Publication Data
US 2016/0171462 A1    Jun. 16, 2016

Related U.S. Application Data

(63) Continuation of application No. 14/562,485, filed on Dec. 5, 2014.

(51) Int. Cl.
| | |
|---|---|
| G06F 3/048 | (2013.01) |
| G06Q 20/10 | (2012.01) |
| G07F 19/00 | (2006.01) |
| G06Q 20/32 | (2012.01) |

(52) U.S. Cl.
CPC .......... *G06Q 20/1085* (2013.01); *G06F 3/048* (2013.01); *G06Q 20/32* (2013.01); *G07F 19/205* (2013.01)

(58) Field of Classification Search
USPC ......................................................... 235/379
See application file for complete search history.

(56) References Cited

U.S. PATENT DOCUMENTS

| | | | |
|---|---|---|---|
| 7,177,838 | B1 | 2/2007 | Ling |
| 7,328,189 | B2 | 2/2008 | Ling |
| 7,606,560 | B2 | 10/2009 | Labrou et al. |
| 7,784,684 | B2 | 8/2010 | Labrou et al. |
| 7,848,980 | B2 | 12/2010 | Carlson |
| 7,992,779 | B2 | 8/2011 | Phillips et al. |
| 8,380,177 | B2 | 2/2013 | Laracey |
| 8,561,891 | B2 | 10/2013 | Dent et al. |
| 8,584,251 | B2 | 11/2013 | McGuire et al. |
| 8,862,508 | B2 | 10/2014 | Maiorino et al. |
| 2002/0111790 | A1 | 8/2002 | McBrearty et al. |
| 2003/0084046 | A1 | 5/2003 | Rogers et al. |
| 2007/0265948 | A1* | 11/2007 | Maiorino ............... G06Q 40/00 705/35 |

(Continued)

*Primary Examiner* — Christle I Marshall
(74) *Attorney, Agent, or Firm* — Michael A. Springs; Moore & Van Allen PLLC; W. Kevin Ransom

(57) ABSTRACT

Embodiments of the invention are directed to a system, method, or computer program product for receiving a customization that will be displayed on the screen of an ATM based on a customer initiating a session with the ATM. The customization is associated with a function to perform a financial transaction. The function is performed as a result of the customer interacting with the customization on the screen of the ATM. The customization may be altered based on a handicap impairment of the customer. The displaying of the customization may be restricted for security purposes or as a request of the customer.

20 Claims, 10 Drawing Sheets

(56) References Cited

U.S. PATENT DOCUMENTS

| | | |
|---|---|---|
| 2008/0114677 A1 | 5/2008 | Keohane et al. |
| 2009/0164327 A1 | 6/2009 | Bishop et al. |
| 2010/0241571 A1 | 9/2010 | McDonald |
| 2012/0203700 A1 | 8/2012 | Ornce et al. |
| 2013/0110658 A1 | 5/2013 | Lyman et al. |
| 2013/0159178 A1 | 6/2013 | Colon et al. |
| 2013/0218767 A1 | 8/2013 | Goldman |
| 2013/0246258 A1 | 9/2013 | Dessert |
| 2013/0254115 A1 | 9/2013 | Pasa et al. |
| 2013/0262315 A1 | 10/2013 | Hruska |

* cited by examiner

ATM CUSTOMER DEFINED USER INTERFACE FOR SECURITY PURPOSES

CROSS-REFERENCE TO RELATED APPLICATION

The present application is a continuation of co-pending U.S. patent application Ser. No. 14/562,485, filed Dec. 5, 2014, and titled "ATM CUSTOMER DEFINED USER INTERFACE FOR SECURITY PURPOSES," which is hereby incorporated by reference in its entirety.

BACKGROUND

The advent of the Automated Teller Machine (ATM) has provided customers with convenient access to perform banking operations report of the financial institutions. This includes deposits, cash withdraws, and other transactions, such as receiving stamps, or the like. Typically, ATM machines are located on busy street corners, drive-up windows and in other public locations. Banks and ATM designers actively pursue technology that will increase customer privacy when performing ATM transactions.

BRIEF SUMMARY

Embodiments of the present invention address the above needs and/or achieve other advantages by providing apparatuses (e.g., a system, computer program product and/or other devices) and methods for a system for displaying a custom interface associated with a customer on a screen of an automated teller machine (ATM).

In some embodiments of the invention, the system presents, to a customer, an option to create a customization for displaying information on the screen of an ATM. The customization may be created through a custom application that is accessed via a mobile device, an ATM, or on another computing device. In some embodiments, the customization will be associated with the customer. In other embodiments, the customization may be created on behalf of the customer. In some embodiments, the customization will be associated with a function to perform a financial transaction when the customer interacts with the customization on the screen of the ATM.

After the customization is created, the person creating the application may submit the customization to the system, where it is received.

After the customization has been received by the system, when the customer initiates a session with an ATM, the ATM may send a request to the system to retrieve the customization. Upon the system receiving the request to display the customization on the screen of the ATM, the system communicates the customization to the ATM.

The customer is allowed to interact with the customization on the screen of the ATM. Upon interacting with the customization, the ATM sends a request to the system to perform a financial transaction. Upon receiving the request to perform the financial transaction, the system performs the financial transaction In some embodiments, the customization can be represented as an icon on the screen of the ATM. During the creation process, the customer may specify the shape, size, color and where the icon is displayed on the screen.

In further embodiments, the customer may submit, to the system, information regarding a handicap of the customer. For example, the handicap may be a visual impairment. In some embodiments, where the customer submits information regarding a visual impairment, the system may receive such information and as a result communicate an instruction to the ATM to enlarge the customization based on receiving the information that the customer is visually impaired.

In other embodiments, the customization may further comprise private account information of the customer. The system may allow the customer to display the customization in a way to protect the private information from being accessible or viewable to other entities. The system may allow the customer to design the customization such that private information appears at a specific location on the screen. Additionally, the system may allow the customer to design the customization such that for a given ATM, the ATM does not display the private information at all. Based on such a communication, the system may instruct the ATM to display the private information in accordance with the design of the customer.

In some embodiments, while the system may suggest a customization to a customer. The customization may be based on the financial transaction history of the customer, a typical transaction the customer makes, accounts the customer holds, and the like.

In other embodiments, the financial transaction may comprise a specific type of transaction such as transferring money from a first account held by the customer into a second account held by the customer, paying a bill, withdrawing money from an account. In other embodiments, the customization may further comprise a function to perform a reporting task. The reporting task may be reviewing a financial document, reviewing a stock quote, displaying the weather forecast, and the like.

In some embodiments, the customization may further comprise an instruction for the ATM to communicate an audible signal when the customer interacts with the customization. As was previously suggested, the system may receive information of a handicap of the customer. As a result, the customization may instruct the ATM to generate a proper output to the customer based on the handicap, such as an audible signal based for a customer with sight issues.

In other embodiments, the customization further comprises a security credential. When the customer interacts with the customization, the customization may require the ATM to take additional security measures in order to verify the customer. Based on the result of the security measure, the system may determine whether to perform the financial transaction.

In other embodiments, the customization further comprises a restriction for displaying the customization on the ATM. The system may communicate the customization based on such a restriction. The restriction may relate to a time of day or day of the week, the maintainer of the ATM, a location of the ATM and the like.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
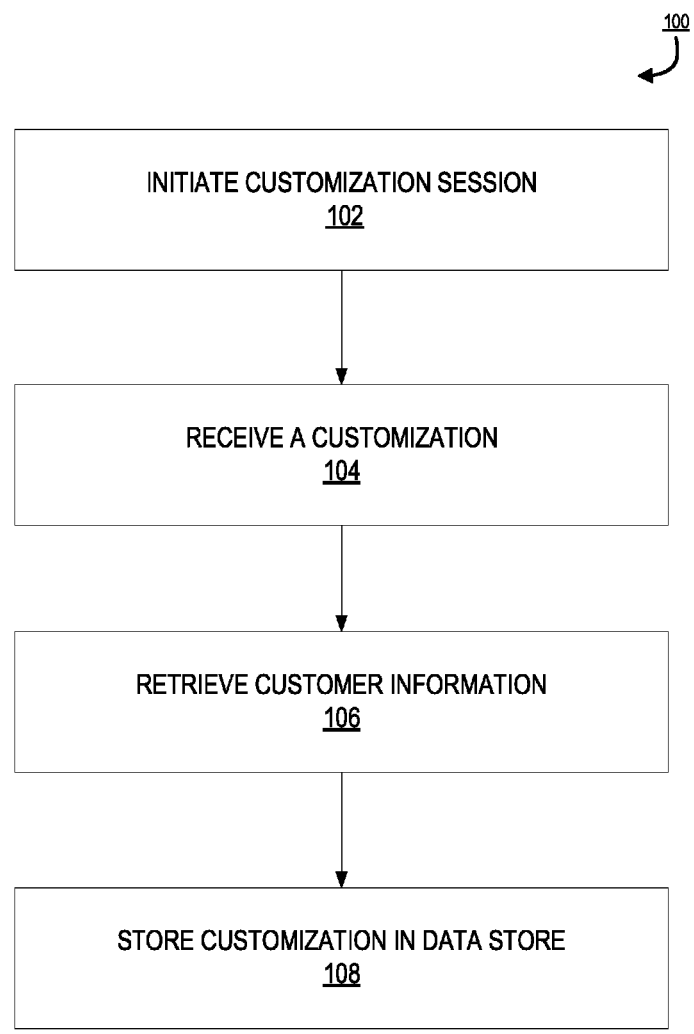
Figure 1B:
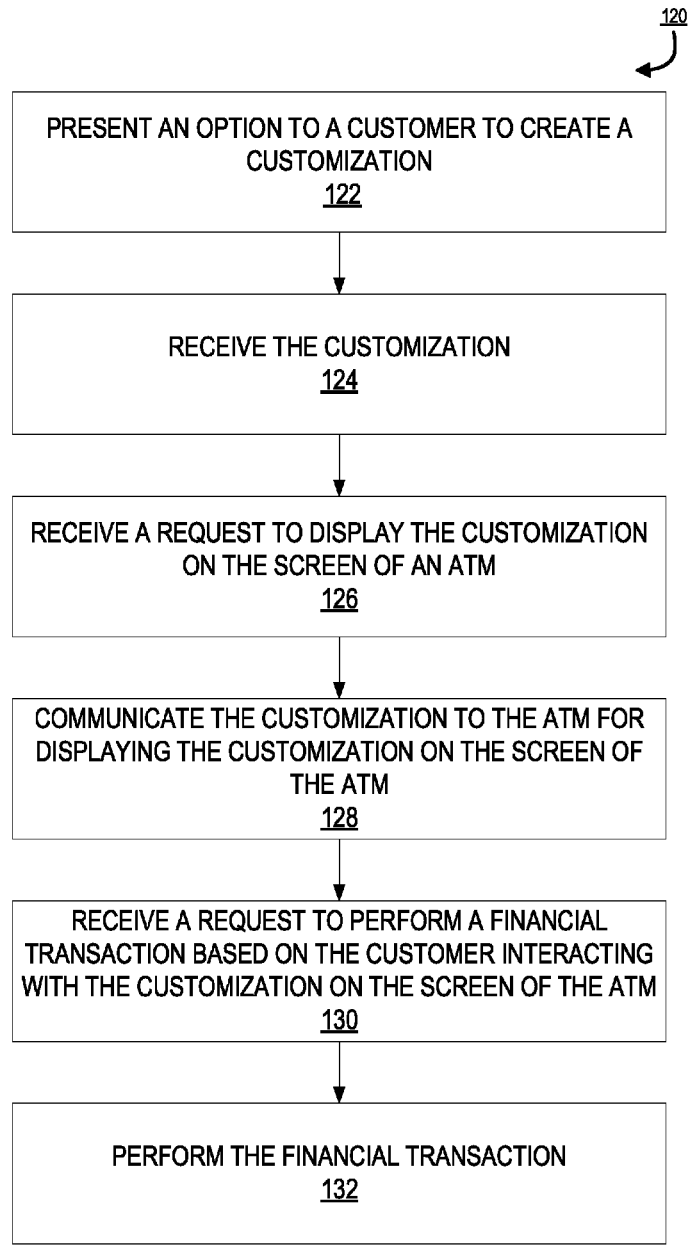
Figure 2:
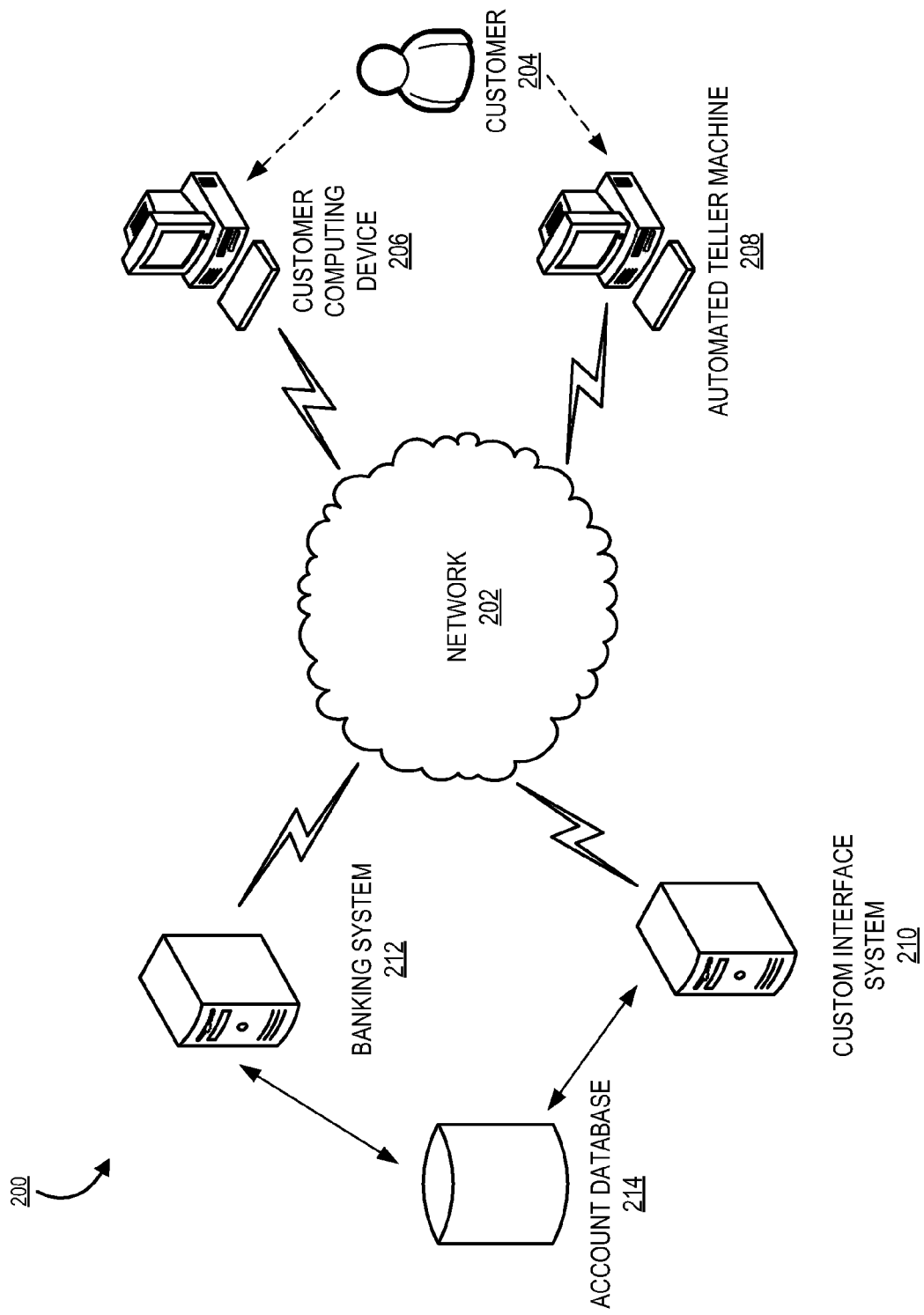
Figure 3A:
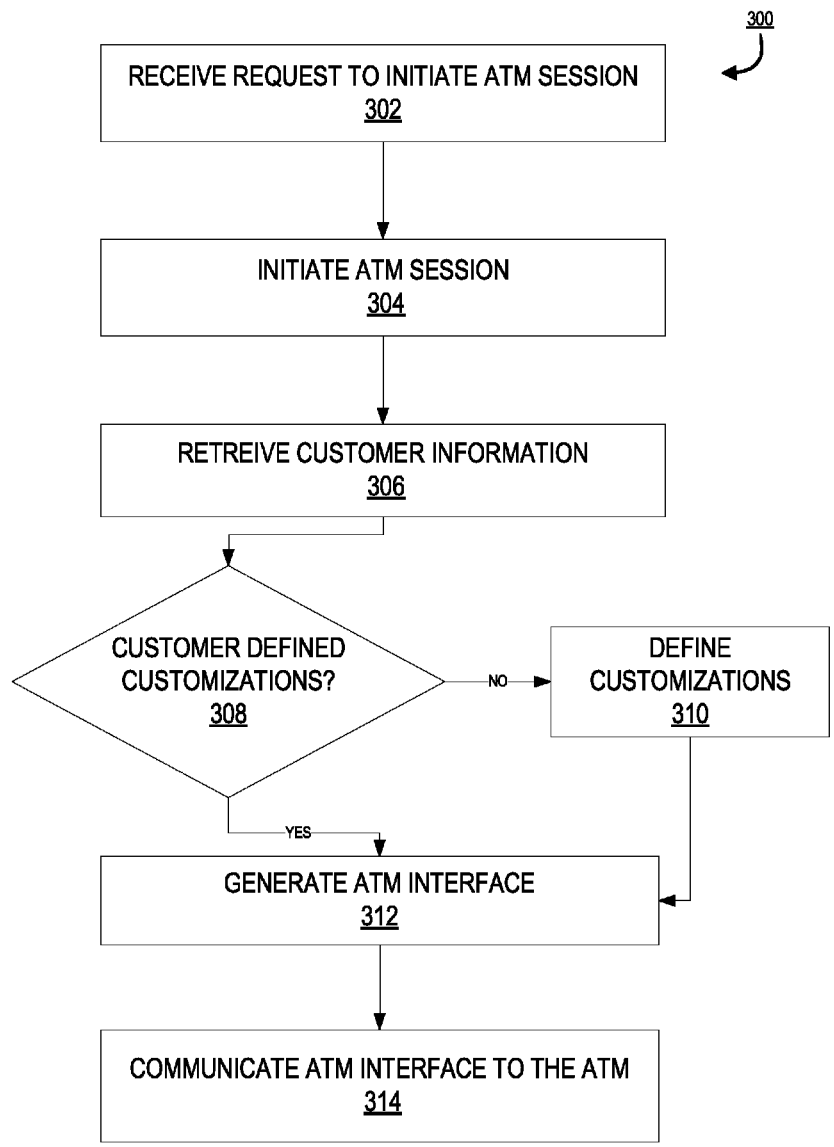
Figure 3B:
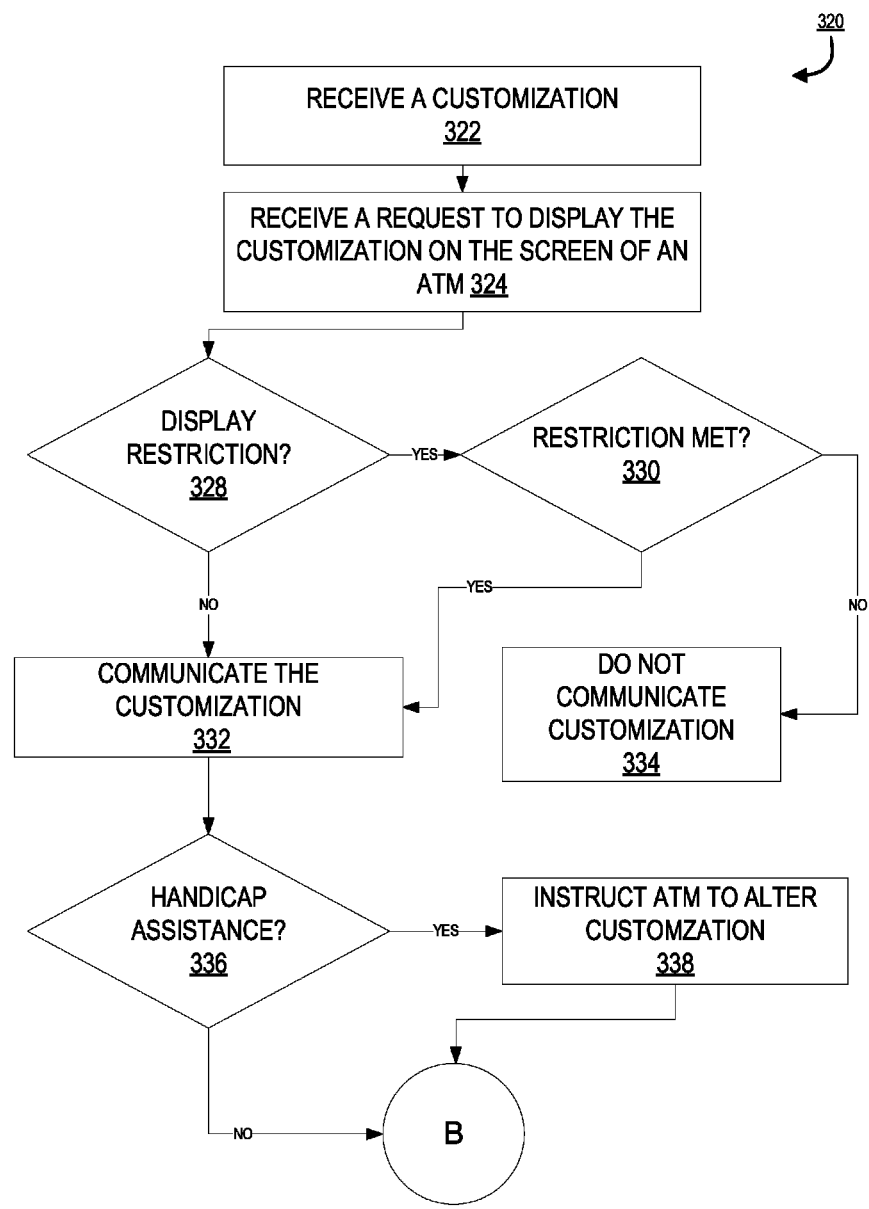
Figure 3C:
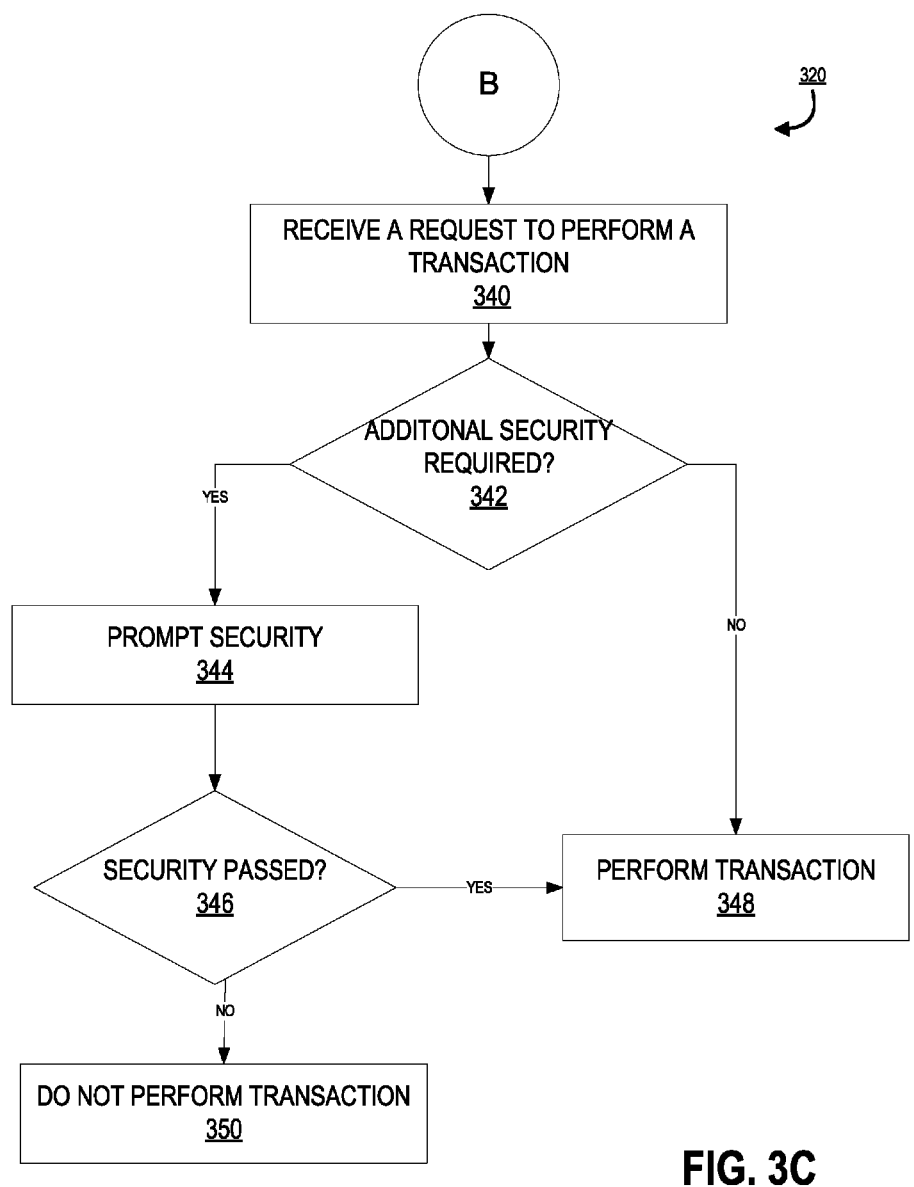
Figure 4:
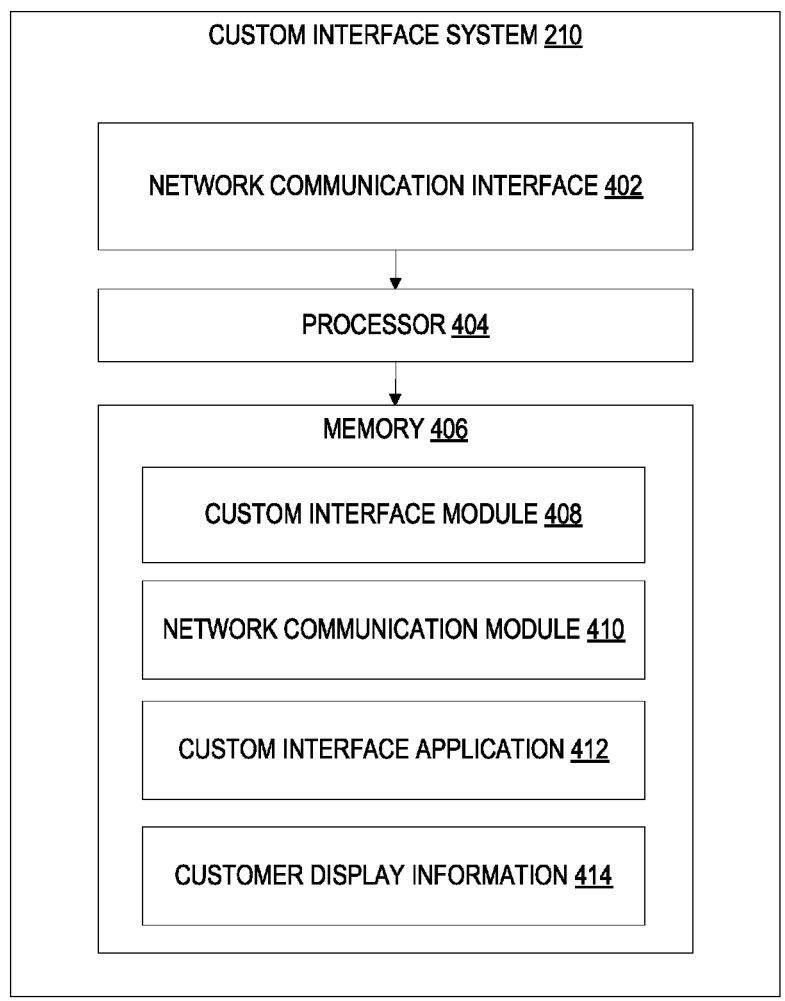
Figure 5:
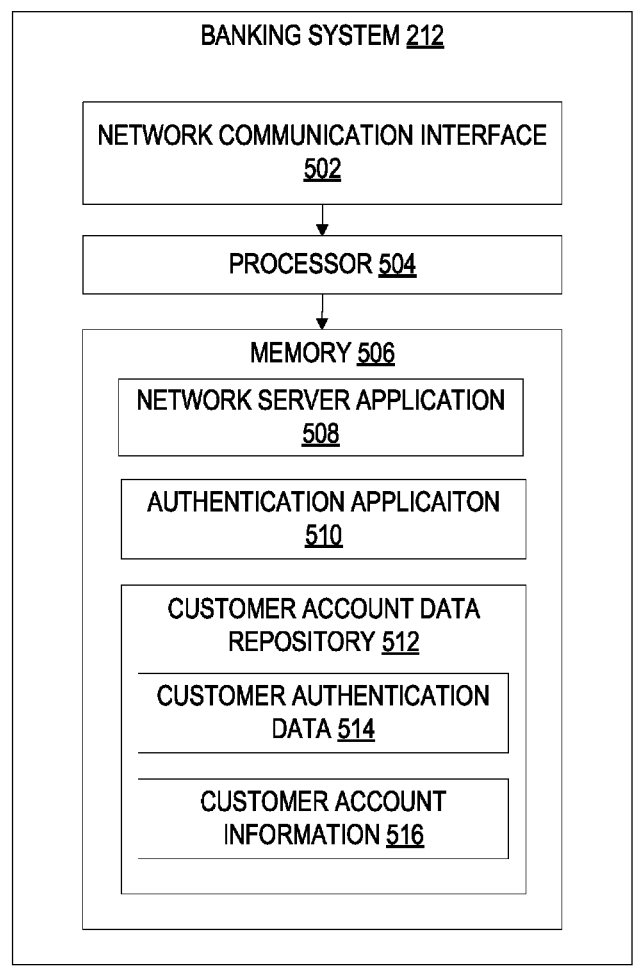
Figure 6:
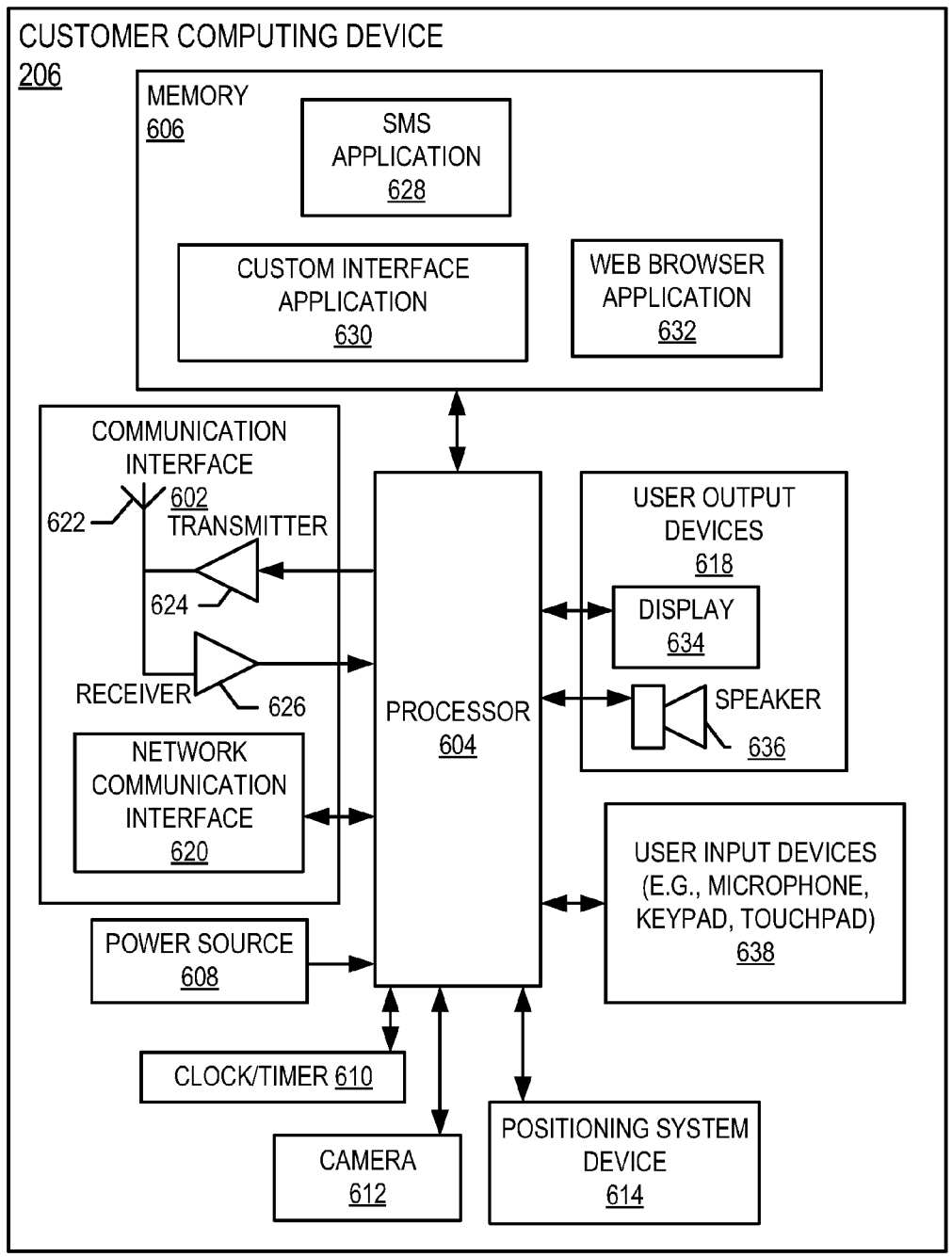
Figure 7:
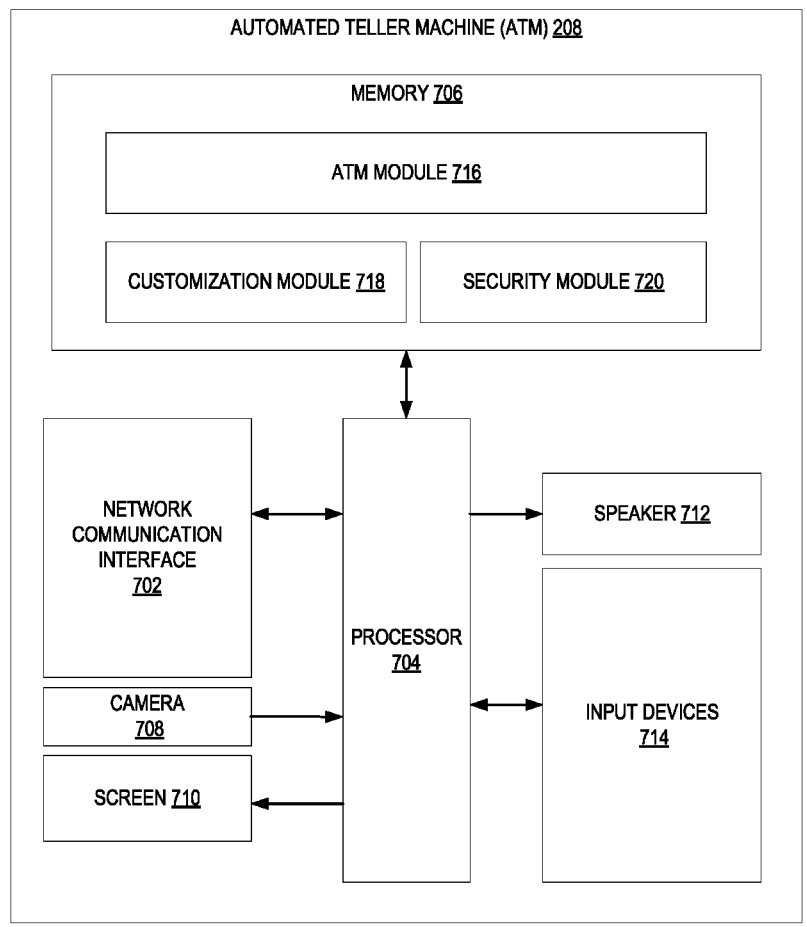

Having thus described embodiments of the invention in general terms, reference will now be made to the accompanying drawings, wherein:

FIG. 1A provides a flow diagram of a method for receiving a customization for an ATM interface for displaying the ATM interface on the screen of an ATM, in accordance with one embodiment of the present invention;

FIG. 1B Provides a flow diagram of a method for communicating a customization to an ATM for displaying said customization on a screen of the ATM;

FIG. 2 provides a schematic and block diagram of a system configured for receiving customizations for an ATM interface for displaying the ATM interface on the screen of an ATM, in accordance with one embodiment of the present invention;

FIG. 3A provides a flow diagram of a method for creating an ATM interface based on a customization associated with a customer and communicating the ATM interface to an ATM for displaying the ATM interface on the screen of the ATM, in accordance with one embodiment of the present invention;

FIG. 3B provides a flow diagram of a method for creating and displaying a customization associated with a customer on the screen of an ATM;

FIG. 3C provides a flow diagram of the method for creating and displaying the customization associated with the customer on the screen on the ATM;

FIG. 4 provides a schematic and block diagram of a custom interface device configured for receiving customizations for an ATM interface for displaying the ATM interface on the screen of an ATM, generating the custom ATM interface, and communicating the ATM interface to the ATM, in accordance with one embodiment of the present invention;

FIG. 5 provides a schematic and block diagram of a banking system, in accordance with one embodiment of the present invention;

FIG. 6 provides a schematic and block diagram of a custom computing device for creating customizations for an ATM interface and communicating the customization, in accordance with one embodiment of the present invention;

FIG. 7 provides a schematic and block diagram of an ATM, in accordance with one embodiment of the present invention;

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that offer Automated Teller Machines (ATM).

Some portions of this disclosure are written in terms of a financial institution's unique position with respect to customer transactions. As such, a financial institution may be able to utilize its unique position to create and update ATM transactions with a customer.

The embodiments described herein may refer to the initiation of a transaction, transaction event initiated, or ATM event at to trigger the steps, functions, routines, or the like described herein. In various embodiments, occurrence of a transaction triggers the sending of information such as authentication information or the like via an ATM to initiate an ATM transaction. Unless specifically limited by the context, a "transaction", "transaction event" or "point of transaction event" refers to any customer interaction with an ATM. As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a transaction may refer to one or more of a customer interaction with an ATM, such as an account balance inquiry, a payment, a purchase, a withdraw, a rewards transfer, an account money transfer, an opening of a bank account, and/or the like.

In some embodiments, an ATM is or includes an interactive computer terminal that is configured to initiate, perform, complete, and/or facilitate one or more transactions. An ATM could be or include any device that a customer may use to perform a transaction with an entity.

In some embodiments, an ATM is operated in a public place (e.g., on a street corner, in an open market, at a public rest stop, or the like). In other embodiments, the ATM is additionally or alternatively operated in a place of business (e.g., in a retail store, post office, banking center, grocery store, factory floor, or the like). In accordance with some embodiments, the ATM is owned by the financial institution providing the ATM. In other embodiments, the ATM is owned by one or more third party merchants. In yet other embodiments, the ATM is owned by other financial institutions.

Embodiments of the present invention address the above needs and/or achieve other advantages by providing an apparatus (e.g., a system, computer program product, and/or other devices) and methods for displaying customized displays on an automated teller machine (ATM). In this way, the invention receives and authenticates security credentials for a customer in order to present customized displays that are associated with the customer on an ATM so the customer may perform financial transactions and view data associated with customer accounts.

In some embodiments, the invention may be configured to receive requests from a customer to add or change customized features on one of the customer specific displays. The system will store the feature and then present the customer with the updated display showing the feature. Thus the customer can setup the displays in a manner that is comfortable to the customer.

In some embodiments, the customer may customize what information is displayed in particular scenarios. Some scenarios may be based on parameters such as whether the ATM being used belongs to a particular financial institution, the time of day that the ATM is accessed, and the screen size of the ATM. Further, the invention may be configured to display information based on typical transactions that a customer performs.

In some embodiments, the customized display may also incorporate navigation controls that allow the customer to select other displays which may be customized or standard to the financial institution or the specific ATM.

In some embodiments, the invention display may present information that is associated with one of the customer accounts and may also allow the customer perform a transaction associated with the accounts. Some of the transactions may include withdrawing a specific amount of money from a selected account, performing a transaction associated with an investment account, pay a bill, deposit money into an account, transfer money between accounts, or view a financial record.

In addition, to specifying the content on the display, the customer may also customize the way it appears on the display. The customer may select where on the display the content appears. Additionally, the customer may also select features for displaying the content such as: associating an icon with the content, adjusting the size of the content, applying text, and applying colors. The invention may be configured to supply instant color schemas to aid in the customer customizing the displays.

In some embodiments, the invention may be configured to include in the displays information that is not specific to the customer but may still be customized by the customer. The information may include stock reports, news events, weather conditions, sports scores, and the like.

In some embodiments, the invention may be configured to provide features in the displays that provide handicap assistance. The content on the display may be adjusted to provide easier viewing, or present audible tones associated with an occurrence of one of the features.

In general, an ATM that the customer uses to access the account does not need to be maintained by the financial institution that manages the account of the customer. As a result, different ATMs managed by different entities may result in different interfaces by which the customer must navigate to perform the desired transaction. Even on ATMs that are managed by the same entity, the customer interface presented to the customer may present challenges to a customer in not providing the functionality required by the customer or present the information in a way that is not familiar to the customer. As a result, the customer not be able to perform functions on the ATM or may need to enter into a service center of the financial institution that manages the customer's account to perform the transaction. Depending on the time of the day or the day on which the customer desires to perform the transaction, the service center may be closed and prevent the customer from performing the transaction at the point in time.

Accordingly, one aspect of the present invention embraces an method by which the customer may customize an interface of an ATM for ease of navigation and include on the interface customizations to perform specific transactions on an account associated with the customer that may not be typically available on other ATMs (e.g. pay a bill associated with a merchant). Following this method, the customer initiates a session with a custom interface system using a computing device (e.g. mobile device). The customer creates an interface by selecting customizations on the computing device and associating transactions to the customization. The customer communicates the customization to the custom interface system which associates the customization with the customer and stores the customization. At another point, when the customer accesses an ATM, the ATM will request from the custom interface system an interface for the customer. The custom interface system will retrieve the customizations for the customer and create a customized ATM interface. Based on retrieving the customizations, the custom interface system will then communicate the interface to the ATM in order to display the customizations to the customer.

Referring to FIG. 1A, a flow diagram of a method 100 for receiving a customization for an ATM interface for displaying the ATM interface on the screen of an ATM. The first step of method 100 is represented by block 102 for initiating a customization session from a customer. The customer may initiate the customization session with the custom interface system by using a computing device. The computing device may be a personal mobile device or some other form of computing device. In some embodiments, the computing device may contain a web browsing module wherein the customer directs the browser to a web address which sends a request to the custom interface system. The custom interface session sends a response back to the customer. In some embodiments, the response may be a web application that is processed by the browser of the computing device which allows the customer to create the ATM interface. In other embodiments, the computing device may contain an executable program that is executed by the processor of the computing device (e.g. a mobile application). The executable program is capable of initiating a session with the custom interface system by sending a request to the system wherein the system communicates a response back to the computing device which may be a message stating the session has been initiated. The system may further store a session key associated with the session and communicate the session key to the computing device.

The next step of method 100 is represented by block 104 for receiving a customization. In some embodiments, either the web application or the application executed by the computing device allows the customer to design an interface for ATM by designing customizations. In some embodiments, a customization is a graphical aid displayed on the screen of an ATM which is associated with at least one function. The graphic aid may be an icon or another visual display. The customer may be able to specify features for the graphic aid (e.g. size, shape, color, opacity, position, or the like). The customer may also associate at least one function with the customization and an event (e.g. touching the graphic aid on the screen of an ATM) such that when the event has been triggered, the ATM may be customized to perform the at least one function associated with the customization. The function triggered by the ATM may be a withdrawal of money from a financial account, a transfer funds between accounts, a payment of a bill from an account, a request to view a balance of an account, sending an email to a particular address, printing a receipt, and generating a report. Functions may be combined and executed by a specific event. For example, a customer may define a customization and associate with the customization an event wherein upon pressing an icon on the display of an ATM, the ATM will execute a request to withdraw twenty dollars from a checking account associated with the customer, send the customer an email detailing that the ATM executed the transaction, and print a receipt with the balance of the checking after the withdrawal.

After the customer has defined a customization, the customer may submit the customization to the custom interface system via the computing device. The computing device may send a request to the computing device which comprises information about the customization, customer information, and session information.

The next step of method 100 is represented by block 106 for retrieving customer information. Upon receiving the request containing the customization, the custom interface system may analyze the request for customer information. The customer information may be a customer identification number or another identification number that is associated with the customer. The system may also analyze the request for a session identifier wherein the identifier contains information about a session stored on the system associated with the customer and contains information about the customer. Upon analyzing the request for customer information, the system may further retrieve other information from a data store about the customer. For example, the system may retrieve the preferences of the customer, financial account information associated with the customer, and the like.

In block 108 the customization is stored in a data store.

FIG. 1B illustrates a method 120 for communicating a customization to an ATM for displaying said customization on a screen of the ATM. Block 122 of method 120 illustrates presenting an option, to a customer, to create a customization. The system may present an application to the customer. In some embodiments, the system may manage a web server that communicates a web application to the customer. In other embodiments, the application may refer to an application that is executed by a mobile device. While in other embodiments, the application may be presented to the customer on an ATM. Regardless of the application, the customer may create the customization using the application.

The customization will be displayed on the screen of an ATM as a result of the customer initiating a session with the ATM. The customization will be associated with the customer. In some embodiments, the customization may only be displayed on the screen of an ATM when the customer initiates a session with the ATM. In other embodiments, the customer may share or give access to another person to the customization. The system may make a record of the sharing. Therefore, when the other person initiates a session with the ATM, the ATM will display the customization for the other person.

The customization may be represented by an icon. The customer will have the ability to determine the shape, size, color, image, and screen position of the icon as it relates to a screen on the ATM. Additionally, the customer may select functions for the ATM to perform based on the customer interacting with the customization on the screen of the ATM. The functions may be financial or reporting in nature. For example, the function may relate to transferring money from one account to another, paying a bill, or withdrawing money from the ATM. Where the function is reporting, the function may be viewing a document, receiving news or stock reports, and sending a communication. The customization may be associated with multiple functions. For example, the customization may have a function to transfer money from a savings to a checking account, withdraw a given amount of money and then send an email to an email address of the customer stating the withdrawal was made.

Interacting with the customization may be done in any manner available through an ATM, which includes but is not limited to using a button associated with the ATM, using a touchscreen on the ATM, using voice command if available on the ATM, and the like. In some embodiments, the customer may interact with the ATM through a mobile device in order to interact with the customization. In such an embodiment, the mobile device may show the customization and after the customer interacts with the customization, the mobile device may communicate a request to the ATM to perform the function associated with the customization, such as by WiFi, near field communication, Bluetooth, etc.

Block 124 of the method 120 illustrates receiving the customization. In some embodiments, the system receives the customization as a result of the customer creating the customization using the application. In other embodiments, the system may suggest a customization to the customer. The suggestion may be based on a financial history of the customer. In other embodiments, the system may track the transactions that a customer performs at a particular ATM and makes a suggestion based on tracking the transactions. In other embodiments, the customization may be based on the popularity of a customization among a group of people. For example, the system may track a particular customization based on the number of times the customization is shared. In other embodiments, the system may present a list of generic customizations and track the amount of the times that each customization is selected. In other embodiments, the system may suggest the customization based on another person suggesting the customization to the customer. In each case, the customer may select or create the customization and based on such, the system receives the customization.

The customization the financial information associated with the customization is associated with an individual. In some embodiments, the financial information may relate to the customer. In other embodiments, the financial information may relate to another person. For example, a parent may share a customization with a child, wherein the customization comprises a function to withdraw a given amount of money from an account of the parent. In other embodiments, the financial information may be related to a customer once the customer accepts the customization. The system may refer a popular customization to the customer. As the customer selects the customization, the system may associate financial information of the customer with the customization. For example, a customization may be suggested to the customer which moves a given amount of money from a checking account to a savings account every time the customer performs a withdrawal using the ATM. Before the customer selects the customization, the customization is generic and is not related any given person. As the customer selects the customization, the system may request to know which accounts to use in for withdrawing and depositing.

Block 126 of method 120 illustrates receiving a request to display the customization on the screen of an ATM. When the customer initiates a session with an ATM. The ATM may send a request to the system where the customization is stored. Based on receiving the request, the system may send the customization to the ATM. In some embodiments, the customer may specify restrictions for displaying the customization. In some embodiments, the customization may be restricted to the type of ATM that may display it. In other embodiments, the customer may restrict the customization to a time of day or a day of the week in which the customization may be displayed. In other embodiments, the customer may further restrict the customization once a particular threshold has been reached. For example, the customer may restrict the customization from being displayed until the customer has transferred a given amount of money from a checking account into a savings account. Another example would state that the customization could not be displayed if the customer has withdrawn a given amount of money out of one account. After the system receives the request to display the customization, the system may communicate the customization to the ATM, as illustrated in block 128.

Block 130 of method 120 illustrates receiving a request to perform a financial transaction based on the customer interacting with the customization on the screen of the ATM. In some embodiments, the system may require the ATM to request additional security credentials from the customer. This additional security may be specified by the customer during the creation of the customization or may be required by the system automatically or based on particular factors such as the balance of an account of the customer, a transaction history, and a credit score of the customer. Additionally, the system may scan for duplicitous transactions. The scanning may be for an account of the customer or it may be for a particular ATM.

Where the system requires additional security credentials in order to authenticate the customer, the system may direct the customer to insert a personal identification number (PIN), rescan a card, enter into a password, answer a security question, and the like. After the customer has been authenticated, the system may perform the financial transaction in accordance with block 132. In other embodiments, the system may perform the transaction without any additional security besides the initial security that the customer performed to initiate the session with the ATM.

FIG. 2 illustrates an operating environment 200, according to one embodiment of the invention that implements a custom interface process. As illustrated in FIG. 2, the operating environment 200 typically includes a custom interface system 210 used to receive customizations associated with a customer 204 and generate custom ATM interfaces for display on an ATM 208, a banking system 212 (e.g. for receiving requests from an ATM to perform financial transactions on an account associated with a customer), a customer computing device 206, an ATM 208, and a database 214 for storing information related to customer information.

The custom interface system 210, the banking system 212, the customer computing device 206, and the ATM 208 are typically configured to communicate over a network 202. The customer interface system 210, the banking system 212, account database 214, the customer computing device 206, and the ATM 208 are each described in greater detail below with reference to FIGS. 4-7. The network 202 may include a local area network (LAN), a wide area network (WAN), and/or a global area network (GAN). The network 202 may provide for wireline, wireless, or a combination of wireline and wireless communication between devices in the network. In one embodiment, the network 202 includes the Internet.

FIG. 3A illustrates creating an interface for display on an ATM 208 based on receiving customizations associated with a customer 204. At block 302, the custom interface system 210 receives a request, from a customer 204, to initiate an ATM session. In some embodiments, the ATM 208 is equipped with a magnetic card reader, a display, and a keypad. The customer 204 may access the ATM 208 by swiping a bank card with the magnetic card reader and entering a personal identification number (PIN). In other embodiments, the ATM may request another form of authenticating the customer. After the ATM 208 receives the customer credentials, the ATM may be configured to communicate to the custom interface system 210 a request to initiate an ATM session. In addition, the ATM 208 may communicate a request to a banking system 212 for validation of the customer credentials. In some embodiments, the custom interface system 210 may provide authentication of the customer credentials. In yet other embodiments, the custom interface system 210 may forward the customer credentials to a banking system 212 for authenticating the customer credentials, upon which the banking system 212 communicates a response back to the custom interface system 210.

At block 304, the custom interface system 210 sends a response to the ATM 208 containing a session identifier, thus initiating the ATM session. In some embodiments, the custom interface system 210 stores a copy of the session identifier in memory 406. At block 306, the custom interface system 210 retrieves customer information. The custom interface system 210 may retrieve the customer information by interacting with a database 214 or by sending a request to the banking system 212 whereupon the banking system communicates a response with the customer information. In some embodiments, the customer information includes customizations defined by the customer during customization sessions. Additionally, the customer information may include other information about the customer such as bank account information, transaction history, and the like.

At block 308, the custom interface system 210 analyzes the retrieved customer information for customizations. If customizations are present, the custom interface system 210 may advance to block 312; however, if the customizations are not present, the custom interface system 210 may advance to block 310 in order to define customizations. In some embodiments, the defined customizations of block 310 may be generated based on default settings of the custom interface system 210. In other embodiments, the customizations may be generated based on other customer information. For example, the custom interface system 210 may analyze that from the customer's transaction history, the customer has performed a particular transaction on several occasions. The custom interface system 210 may be configured to generate a customization based on the repeated transaction by analyzing the customer's transaction history.

At block 312, the custom interface system generates an interface for display on the screen of an ATM 208. In some embodiments, the custom interface system 210 generates the interface based on the customizations associated with the customer. In other embodiments, the system may be configured to include information in addition to the customizations associated with the customer. For example, the system may include a weather report, a stock analysis, and the like. The additional information may be based on other customer information retrieved by the custom interface system 210.

In some embodiments, the custom interface system 210 may generate the interface based on the ATM 208 being accessed by the customer 204. For example, if the ATM 208 being accessed is not maintained by the financial institution, the system may limit or not display any of the customizations associated with the customer. Additionally, the custom interface system 210 may also be configured to generate the interface based on other factors such as the time of day the customer accesses the ATM 208, the dimensions of the screen of the ATM 208, or the location of the ATM 208. Finally, at block 314, the custom interface system 210 communicates the interface to the ATM 208 for display on the screen of the ATM.

FIG. 3B and FIG. 3C illustrate a method 320 for creating an displaying a customization on the screen of an ATM in accordance with various embodiments of this invention. Block 322 of the method 320 illustrates receiving a customization. In some embodiments of the invention, a customer 204 may interact with a customer computing device 206 or an ATM 208 in order to create a customization. The customization is associated with the customer 204. In some embodiments, the customization is displayed on an ATM 208 when the costumer 204 initiates a session with the ATM 208. In other embodiments, the costumer may share the customization with a second person. When the second person initiates a session with the ATM 208, the ATM displays the customization. The ATM 208 and the customer computing device 206 may allow the customer 204 to create the customization. The customization may be represented by an icon. The costumer 204 may define the shape, size, color and position on the screen 710 of the ATM 208. The costumer 204 may also associate a function with the customization. The function may be financial or non-financial in nature. The customization may be associated with any number of functions. In addition to the functions specified by the customer, the custom interface system 210 may associate additional functions to the customization. The customer 204 may order the functions such that the functions are performed in a particular order.

In addition to the customer 204 creating the functions, the custom interface system 210 may communicate various customizations to the customer 204 via the custom computing device 206 or the ATM 208. The various customizations may be based on a transaction history of the customer 204. In such a case, the custom interface system 210 may communicate with the banking system 212 or the account database 214 in order to obtain a transaction history of the customer 204. In other embodiments, the custom interface system 210 may suggest a customization based on a second person sharing the customization with the customer 204. In other embodiments, the custom interface system 210 may suggest a customization based on the popularity of a customization. The custom interface system 210 may store several generic customizations and present the customizations to a customer 204 in a store like setting. The customizations in the store like setting may be presented on the customer computing device 206 and the automated teller machine 208. The customizations on the store like setting may have customer reviews and ratings. The custom interface system 210 may display the customizations based on the rating of the customization, the number of reviews of the customization, and the amount of times that a person has selected the customization.

In some embodiments, a customization may be associated with the specific financial information of the customer 204. In other embodiments, the customization may contain financial information associated with another person. For example, a parent may create a customization which contains a function to withdraw a given amount of money with a per month withdrawal limit. The patent may share the customization with a child of the parent. The function of the customization is directed to an account of the parent and not the child.

The function may be executed as a result of the customer 204 interacting with the customization. The interaction may be by any method that is typical of an ATM 208, which may include but is not limited to pressing buttons 714 on the ATM 208, interacting with a touch screen on the ATM, using voice commands on an ATM 208, and using a mobile device to interact with the ATM 208.

In block 324 of the method 320 illustrates receiving a request to display the customization on the screen 710 of the ATM 208. In some embodiments, the customization may comprises a restriction. The restriction may be defined by the customer 204 or by the custom interface system 210. The restriction may be based on an account history of the customer 204, a credit score, a location of the ATM 208, a threshold, and the like. The custom interface system 210 may determine whether there is a display restricting in place as illustrated in block 328 of the method 320. If there is a restriction in place, the system may determine whether the restriction has been met as illustrated in block 330. If the restriction has not been met, the custom interface system 210 will not communicate the customization to the ATM 208 as is illustrated in block 334. In another embodiment, the custom interface system 210 will communicate the customization to the ATM and allow the ATM 208 to interpret the restriction.

If the restriction was met as determined in block 330 or there was not a restriction as determined in block 328, the custom interface system 210 may communicate the customization to the ATM 208 as is illustrated in block 332.

As an example of a restriction, the customization may include a restriction for displaying the customization based on a threshold. The threshold states that the customization may not be displayed unless a customer 204 has deposited a $300 of money into a savings account within a month's period of time. If the customer 204 has deposited $300 of money into the savings account within a month's period of time, the customization will be displayed.

In addition to reviewing the customization for display restrictions, the custom interface system 210 may determine if the customization contains a request for handicap assistance as is illustrated in block 336 of method 320. The banking system 212 may store information related to a customer 204 where the customer has requested handicap assistance. In addition the customer 204 may request handicap assistance during a session with the ATM 208. The handicap assistance may be related to any type of handicap. In particular the handicap may relate to a visual or audible impairment. If the custom interface system 210 determines that the customer 204 has requested handicap assistance, the custom interface system 210 may instruct the ATM 208 to alter the customization based on the request. For example, where the customer 204 is visually impaired, the custom interface system 210 may instruct the ATM 208 to generate an audible signal corresponding to the customization or change the size, appearance or location of the customization on the screen 710 of the ATM 208. Where the customer 204 has requested the handicap assistance using the ATM 208, the ATM may interpret the customization and automatically generate the change.

Block 340 of method 320 illustrates receiving the request to perform a transaction. The customer 204 may interact with the customization in accordance with the various embodiments of this invention. When the customer 204 interacts with the customization, the ATM 208 may communicate a request to the custom interface system 210 to perform a function.

After the custom interface system 210 has received the request, the custom interface system 210 may determine whether the customer 204 needs to supply additional security credentials prior to conducting the function as is illustrated in block 342 of method 320. Such security credentials may be determined automatically by the custom interface system 210 or may be requested by the customer 204. The credentials may be based on analysis either based on a transaction history of the customer 204 or the ATM 208. For example, the custom interface system 210 tracks the number of duplicitous transactions that have occurred using a given ATM 208. The system may require additional security credentials based on such analysis.

If the system determines that additional security credentials are required in accordance with block 342, the custom interface system 210 may prompt the ATM 208 to gather the credentials. The method of gathering the credentials may be in accordance with any typical method used by an ATM such as, but is not limited to, scanning a card, inputting a personal identification number (PIN), answering a security question, etc. The ATM 208 may also request the customer 204 supply security credentials through a mobile device associated with the customer 204. For example, the ATM 208 may communicate with the customer computing device 206 using Bluetooth or near field communication (NFC).

After the customer 204 has submitted the credentials, the ATM 208 may communicate the credentials to the custom interface system 210. After receiving the credentials, the custom interface system 210 may then authenticate the credentials in accordance with block 346 of method 320. If the credentials were properly authenticated, the custom interface system 210 may then perform the function in accordance with block 348 of the method 320. Otherwise, the custom interface system 210 may decline to perform the function in accordance with block 350 of the method 320.

FIG. 4 depicts the custom interface system 210 in more detail. As depicted in FIG. 4, the custom interface system 210 typically includes various features such as a network communication interface 402, a processing device 404, and a memory device 406. The network communication interface 402 includes a device that allows the custom interface system 210 to communicate over the network 202 (shown in FIG. 11) with the (e.g., via the customer computing device 1104), banking system 212, or the ATM 208. The network communication interface 402 may also allow the custom interface system to communicate with the account database 214 (e.g., to store or retrieve customizations associated with a customer).

The custom interface system 210 is typically configured to receive customizations associated with a customer, create custom ATM interfaces based on the customizations, and communicate the custom interfaces to an ATM. Accordingly, the customer interface system 210 typically includes one or more modules stored in memory 406, which facilitate receiving customizations and creating the custom interfaces. As depicted in FIG. 4, the custom interface system 210 typically includes a processing device 404 which is communicably coupled to a network communication interface 402 and a memory device 406. In certain embodiments, the custom interface system 210 is operated by a financial institution, while in other embodiments the custom interface system 210 is operated by an entity other than a financial institution.

It should be understood that the memory device 406 may include one or more databases or other data structures/repositories. The memory device 506 also includes computer executable program code that instructs the processing device 404 to operate the network communicate interface 402 to perform certain communication functions of the communication interface system 210 described herein. In one embodiment, the memory device 406 includes, but is not limited to, a custom interface module 408, a network communication module 410, and a custom interface application 412. In some embodiments, the memory includes custom interface information specific to a customer 414.

In one embodiment, the network communication module 410 instructs the processing device 404 to communicate with other devices on the network 202 using the network communication interface 402. Additionally, in conjunction with the network communication module 410, the custom interface module 408 instructs the processing device to communicate with the banking system 212 in order to receive financial information specific to a customer and for authenticating credentials of a customer.

FIG. 5 provides a block diagram illustrating the banking system 212 in greater detail, in accordance with an embodiment of the invention. As illustrated in FIG. 5, in one or more embodiments of the invention, the banking system 212 includes a processing device 504 operatively coupled to a network communication interface 502 and a memory device 506. In certain embodiments, the banking system 212 is operated by a financial institution, while in other embodiments the banking system 212 is operated by an entity other than a financial institution.

It should be understood that the memory device 506 may include one or more databases or other data structures/repositories. The memory device 506 also includes computer-executable program code that instructs the processing device 504 to operate the network communication interface 502 to perform certain communication functions of the banking system 212 described herein. For example, in one embodiment of the banking system 212, the memory device 506 includes, but is not limited to, a network server application 508, an authentication application 510, a customer account data repository 512 which includes customer authentication data 514 and customer account information 516, and other computer-executable instructions or other data. The computer-executable program code of the network server application 508, the authentication application 510 may instruct the processing device 504 to perform certain logic, data-processing, and data-storing functions of the banking system 212 described herein, as well as communication functions of the banking system 212. In this regard, the processing device 504 is typically configured to allow customers to access their account(s).

In one embodiment, the customer account data repository 512 includes customer authentication data 514 and customer account information 516. The network server application 508, and the authentication application 510, are configured to implement customer account information 516 and the customer authentication data 514 (e.g., customer identification information) when authenticating a customer to the banking system 212. In this regard, the customer authentication data 514 may include a customer's customer name, password, and/or personal identification number (PIN) number. The customer account information 516 may include account identification information.

The customer computing device 206 may be any device that employs a processor and memory and can perform computing functions, such as a personal computer or a mobile device. In this regard, FIG. 6 provides a block diagram illustrating the customer's computing device as a mobile device, in accordance with embodiments of the invention. In one embodiment of the invention, the customer computing device 206 is a mobile telephone. However, it should be understood that a mobile telephone is merely illustrative of one type of mobile device that may benefit from, employ, or otherwise be involved with embodiments of the present invention and, therefore, should not be taken to limit scope of the embodiments of the present invention. Other types of mobile devices may include potable digital assistants (PDAs), pagers, mobile televisions, gaming devices, laptop computers, tablet computers, video recorders, audio/video players, radios, global positioning system (GPS) devices, or any combination of the aforementioned.

The customer computing device 206 typically includes a processor 604 communicably coupled to such devices as a memory 606, customer output devices 618, customer input device 638, a communication interface 602, a power source 608, a clock or other timer 610, a camera 612, and a positing system device 614. The processor 604, and other processors described herein, typically includes circuitry for implementing communication and/or logic functions of the customer computing device 206. For example, the processor 604 may include a digital signal processor device, a microprocessor device, and various analog to digital converters, digital to analog converters, and other support circuits. Control and signal processing functions of the customer computing device 206 are allocated between these devices according to their respective capabilities. The processor 604 thus may also include the functionality to encode and interleave messages and data prior to modulation and transmission. The processor 604 can additionally include an internal data mode. Further, the processor 604 may include functionality to operate one or more software programs, which may be stored in memory 606. For example, the processor 604 may be capable of operating a connectivity program, such as a web browser application 632. The web browser application 632 may then allow the customer computing device 206 to transmit and receive web content, such as, for example location based content and/or other web page content, according to a Wireless Application Protocol (WAP), Hypertext Transfer Protocol (HTTP), and/or the like.

The processor 604 is typically configured to use the communication interface 602 to communicate with one or more other devices on the network 202. In this regard, the communication interface 602 typically includes an antenna 622 operatively coupled to a transmitter 624 and a receiver 626 (together as a "transceiver"). The processor 604 is typically configured to provide signals to and receive signals from the transmitter 624 and receiver 626, respectively. The signals may include signaling information in accordance with the air interface standard of the applicable cellular systems of the network 202. In this regard the customer computing device 206 may be configured to operate with one or more air interface standards, communication protocols, modulation types and access types. By way of illustration, the customer computing device 206 may be configured to operate in accordance with any of a number of first, second, third, and/or fourth generation communication protocols and/or the like. For example, the mobile device 401 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2010, wideband CDMA (WCDMA) and/or time division-synchronous CDMA (TD-SCDMA), with fourth-generation (4G) wireless communication protocols, and/or the like. The customer computing device 206 may also be configured to operate in accordance with non-cellular communication mechanisms, such as via a wireless local area network (WLAN) or other communication/data networks.

The communication interface 602 may also include a communication interface 620. In some embodiments, the interface 620 of the customer computing device 206 is configured to contactlessly and/or wirelessly communicate information to and/or from a corresponding wireless interface of another apparatus (e.g., an ATM or another mobile or computing device).

The customer computing device 206 typically has a customer interface that is, like other customer interfaces described herein, made up of customer output devices 618 and/or customer input devices 638. The customer output devices 618 include a display 634 (e.g., a liquid crystal display or the like) and a speaker 636 or other audio device, which are operatively coupled to the processor 604. The customer input devices 638, which allow the customer computing device 206 to receive data from a customer such as the customer, may include any of a number of devices allowing the customer computing device 206 to receive data from a customer, such as a keypad, keyboard, touch-screen, touchpad, microphone, mouse, joystick, other pointer device, button, soft key, and/or other input device(s). The customer interface may also include a camera 612, such as a digital camera.

The customer computing device 206 may also include a positioning system device 614 that is configured to be used by a positioning system to determine a location of the customer computing device 206. For example, the positioning system device 614 may include a GPS transceiver. In some embodiments, the positioning system device 614 is at least partially made up of the antenna 622, transmitter 624, and receiver 626 described above. For example, in one embodiment, triangulation of cellular signals may be used to identify the approximate location of the customer computing device 206. In other embodiments, the positioning system device 614 includes a proximity sensor or transmitter, such as an RFID tag, that can sense or be sensed by devices known to be located proximate a location to determine that the customer computing device 206 is located proximate these known devices.

The customer computing device 206 further includes a power source 608, such as a battery, for powering various circuits and other devices that are used to operate the customer computing device 206. Embodiments of the customer computing device 206 may also include a clock or other timer 610 configured to determine and, in some cases, communicate actual or relative time to the processor 604 or one or more other devices.

The customer computing device 206 also includes a memory 606 operatively coupled to the processor 604. As used herein, memory includes any computer readable medium (as defined herein below) configured to store data, code, or other information. The memory 606 may include volatile memory, such as volatile Random Access Memory (RAM) including a cache area for the temporary storage of data. The memory 606 may also include non-volatile memory, which can be embedded and/or may be removable. The non-volatile memory can additionally or alternatively include an electrically erasable programmable read-only memory (EEPROM), flash memory or the like.

The memory 606 can store any of a number of applications which include computer-executable instructions/code executed by the processor 604 to implement the functions of the customer computing device 206 described herein. For example, the memory 606 may include such applications as a conventional web browser application 632, a custom interface application 630, and an SMS application 628. These applications also typically provide a graphical customer interface (GUI) on the display 634 that allows the customer to communicate with the customer computing device 206, the custom interface system 210, and/or other devices or systems. In one embodiment of the invention, when the customer decides to create a custom customer interface for display on an ATM, the customer downloads or otherwise obtains the custom interface application from the custom interface system 210 or from a distinct application server. In other embodiments of the invention, the customer interacts with the custom interface system 210 via the web browser application 632 in addition to, or instead of, the custom interface application 412. The custom interface system 210 is typically configured to present a graphical customer interface (e.g., through a mobile banking application or mobile banking website) that allows the customer to use the customer computing device 206 to control access to the customer's online banking account.

The memory 606 can also store any of a number of pieces of information, and data, used by the customer computing device 206 and the applications and devices that make up the customer computing device 206 or are in communication with the customer computing device 206 to implement the functions of the customer computing device 206 and/or the other systems described herein. For example, the memory 606 may include such data as customer authentication information.

FIG. 7 provides a block diagram illustrating the ATM 208 in greater detail, in accordance with an embodiment of the invention. As illustrated in FIG. 7, in one or more embodiments of the invention, the ATM 208 includes a network communication interface 702, a processing device 704, memory 740, a speaker 712, and a screen 710. In certain embodiments, the ATM 208 is operated by a financial institution, while in other embodiments, the ATM 208 is operated by an entity other than a financial institution.

The memory device 706 includes computer executable code that instructs the processing device 704 to operate the network communication interface 702 to perform certain communication functions of the ATM 208. In one embodiment, the memory device 706 may include an ATM module 716, a customization module 718, and a security module 720. The computer executable program code of the ATM module 716, the customization module 718, and the security module may instruct the processing device 704 to perform certain login, data-processing, and data-storage functions of the ATM 208 described herein, as well as communication functions of the ATM 208. In this regard, the processing device is typically configured to communicate with both the banking system 212 and the custom interface system 210 to receive a validate a customer seeking to perform a financial transaction, receive a custom interface for the customer, and display the custom interface on the screen 710. In some embodiments, the ATM module 716 and the customization module 718 may instruct the processing device 704 to communicate sounds through the speaker 712.

It should be appreciated that the screen 710 may include touch screen functionality allowing a customer to interact with the ATM 208. In other embodiments, the customization module 718 allows a customer to design or edit a custom interface associated with the customer using the screen 710. Such interface may be communicated to the custom interface system 702.

In some embodiments of the invention, the customization may comprise private or sensitive customer information such as a balance of a bank account or an account number. The customer 204 may desire that this information be either displayed in a manner on the ATM 208 that would prevent another person from viewing the information or not display the information at all on a given ATM 208. Where the customer 204 designs the customization, the customer 204 may add detail to the customization to prevent the exposure of the private or sensitive information. In one embodiment, the customer 204 may designate that the customization should not be displayed for a given ATM 208. The given ATM 208 may be designated by one of many methods, including, but not limited to, selecting only ATMs 208 that are managed by a financial institution that the customer 204 holds an account with, ATMs 208 within a designated geographic area, ATMs 208 that are of a given make or model, ATMs 208 that offer security features such as a limited viewing angle, ATMs 208 that are located indoors or within the confines of a financial institution, and a time of the day that a transaction is processed. Additionally, the custom interface system 210 may provide additional features to the customization for security purposes. The custom interface system 210 may automatically determine whether to display sensitive information based on the above factors. The custom interface system 210 may also prompt the customer 204 to determine whether to display the sensitive information or not. The custom interface system 210 may also partially display the sensitive information. For example, the custom interface system 210 may only show the last four digits or an account balance. In other embodiments, the custom interface system 210 may require the customer 204 to provide security credentials for authentication prior to prompting the ATM 208 to display the sensitive information.

In another embodiment, the customer 204 may design the customization to place sensitive information on a designated area of the screen of the ATM 208. For example, the customer 204 may elect to place the information at the bottom center of the screen. The customer 204 may elect to display information in this manner based on the above stated factors. The custom interface system 210 may also automatically locate the sensitive information on the screen 710 of the ATM 208. In some embodiments, the custom interface system 210 may receive personal information about the user and display the sensitive information based on the personal information. For example, the custom interface system 210 may receive the height of the customer 204. The custom interface system 210 may determine an optimal height to display the sensitive information on the screen 710 that would prevent the sensitive information from being viewed by another entity but allow the customer 204 to view the information. As another example, the custom interface system 210 may determine whether the customer 204 is right or left handed. Based on such a determination, the custom interface system 210 may place the sensitive information on the side that which the customer 204 is dominant. The custom interface system 210 may also determine to provide the sensitive information to the customer 204 in a secondary manner. For example, the custom interface system 210 may communicate the sensitive information to a personal computing device of the customer 204. The custom interface system 210 may prompt the ATM 208 to display an option to the customer 204 to communicate the sensitive information to the customer 204. The sensitive information may be communicated by email, SMS, or the like.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for displaying a custom interface associated with a customer on a screen of an automated teller machine (ATM), the system comprising
    a non-transitory storage device;
    a communication device;
    a processing device operatively coupled to the storage device and the communication device;
    at least one module stored in said storage device and comprising instruction code that is executable by at least one processor and configured to cause said at least one processor to:
        present, to the customer, an option to create a customization for displaying on the screen of the ATM when the customer initiates a session with the ATM, wherein the customization is associated with a function to perform a financial transaction when the customer interacts with the customization on the screen of the ATM;
        receive the customization, wherein the customization comprises a restriction for displaying the customization on the ATM;
        receive a request to display the customization on the screen of the ATM based on the customer initiating the session with the ATM;
        communicate the customization to display on the screen of the ATM based on receiving the request to display the customization, wherein communicating the customization to the ATM is based on the restriction for displaying the customization;
        receive a request to perform the financial transaction based on the customer interacting with the customization on the screen of the ATM; and
        perform the financial transaction based on receiving the request to perform the financial transaction.

2. The system of claim 1, wherein the option to create the customization is presented to a computing device of the customer.

3. The system of claim 2, wherein the computing device of the customer is a mobile device.

4. The system of claim 2, wherein the customization is received from the computing device of the customer.

5. The system of claim 1, wherein the function to perform the financial transaction comprises sending an email.

6. The system of claim 1, wherein the function to perform the financial transaction comprises printing a receipt.

7. The system of claim 1, wherein the function to perform the financial transaction comprises withdrawing money from a financial account of the customer.

8. A computer program product for displaying a custom interface associated with a customer on a screen of an automated teller machine (ATM) the computer program product including a non-transitory computer-readable medium having computer program code embodied therein, the computer program code comprising:
- an executable portion for presenting, to the customer, an option to create a customization for displaying on the screen of the ATM when the customer initiates a session with the ATM, wherein the customization is associated with a function to perform a financial transaction when the customer interacts with the customization on the screen of the ATM;
- an executable portion for receiving the customization, wherein the customization comprises a restriction for displaying the customization on the ATM;
- an executable portion for receiving a request to display the customization on the screen of the ATM based on the customer initiating the session with the ATM;
- an executable portion for communicating the customization to display on the screen of the ATM based on receiving the request to display the customization, wherein communicating the customization to the ATM is based on the restriction for displaying the customization;
- an executable portion for receiving a request to perform the financial transaction based on the customer interacting with the customization on the screen of the ATM; and
- an executable portion for performing the financial transaction based on receiving the request to perform the financial transaction.

9. The computer program product of claim 8, wherein the option to create the customization is presented to a computing device of the customer.

10. The computer program product of claim 9, wherein the computing device of the customer is a mobile device.

11. The computer program product of claim 9, wherein the customization is received from the computing device of the customer.

12. The computer program product of claim 8, wherein the function to perform the financial transaction comprises sending an email.

13. The computer program product of claim 8, wherein the function to perform the financial transaction comprises printing a receipt.

14. The computer program product of claim 8, wherein the function to perform the financial transaction comprises withdrawing money from a financial account of the customer.

15. A computer-implemented method for displaying a custom interface associated with a customer on a screen of an automated teller machine (ATM), the method comprising:
- presenting, to the customer, an option to create a customization for displaying on the screen of the ATM when the customer initiates a session with the ATM, wherein the customization is associated with a function to perform a financial transaction when the customer interacts with the customization on the screen of the ATM;
- receiving the customization, wherein the customization comprises a restriction for displaying the customization on the ATM;
- receiving a request to display the customization on the screen of the ATM based on the customer initiating the session with the ATM;
- communicating the customization to display on the screen of the ATM based on receiving the request to display the customization, wherein communicating the customization to the ATM is based on the restriction for displaying the customization;
- receiving a request to perform the financial transaction based on the customer interacting with the customization on the screen of the ATM; and
- performing the financial transaction based on receiving the request to perform the financial transaction.

16. The computer-implemented method of claim 15, wherein the option to create the customization is presented to a computing device of the customer.

17. The computer-implemented method of claim 16, wherein the computing device of the customer is a mobile device.

18. The computer-implemented method of claim 16, wherein the customization is received from the computing device of the customer.

19. The computer-implemented method of claim 15, wherein the function to perform the financial transaction comprises sending an email.

20. The computer-implemented method of claim 15, wherein the function to perform the financial transaction comprises printing a receipt.

* * * * *